United States Patent [19]

Franta

[11] 3,894,159
[45] July 8, 1975

[54] METHOD FOR FILLING THE CAVITY OF AN EDIBLE SHELL WITH A CONFECTIONERY FILLING

[75] Inventor: Rudolf Franta, Breitenbrunn, Austria

[73] Assignee: Rondo-Neisse Susswarenindustrie Gesellschaft m.b.H., Breitenbrunn, Austria

[22] Filed: Feb. 26, 1974

[21] Appl. No.: 446,115

Related U.S. Application Data

[63] Continuation of Ser. No. 212,273, Dec. 27, 1971, abandoned.

[30] Foreign Application Priority Data

Dec. 31, 1970 Austria .................................. 11768/70

[52] U.S. Cl. .................................. 426/284; 426/171
[51] Int. Cl. .................................. A23g 3/00; A23g 3/20
[58] Field of Search ........... 426/282, 281, 283, 284, 426/171

[56] References Cited
UNITED STATES PATENTS

| 3,477,851 | 11/1969 | Benson et al. | 426/281 |
| 3,480,445 | 11/1969 | Slaybaugh | 426/284 |

FOREIGN PATENTS OR APPLICATIONS

| 945,083 | 12/1963 | United Kingdom | 426/171 |

*Primary Examiner*—A. Louis Monacell
*Assistant Examiner*—J. M. Hunter
*Attorney, Agent, or Firm*—Kurt Kelman

[57] ABSTRACT

A confectionery filling is supercooled to a temperature below its solidification point, the supercooled filling is injected through a jet nozzle into the cavity of an edible shell at a superatmospheric pressure sufficient to make the filling flowable, and the flowable filling is permitted to solidify in the cavity.

4 Claims, 4 Drawing Figures

METHOD FOR FILLING THE CAVITY OF AN EDIBLE SHELL WITH A CONFECTIONERY FILLING

This is a continuation of application Ser. No. 212,273 filed Dec. 27, 1971, now abandoned.

The present invention relates to improvements in a method for filling the cavity of an edible shell, such as a tubular wafer, with a confectionery filling whose solidification point at atmospheric pressure is no lower than normal room temperature.

Baked goods and confectionery pieces consisting of an edible shell whose cavity is filled with a solid confectionery center and which is coated with chocolate or other candy coatings are well known. It is also customary to fill baked goods in the same manner with a non-sweet filling. Conventionally, the soft filling was sprayed or otherwise placed into the cavity of the baked shell, the filling was permitted to harden in the shell by a suitable lapse of time permitting the filling to cool down to its solidification point, and the filled shell was then coated.

It is the primary object of this invention to automate such a filling operation.

The above and other objects are accomplished in accordance with the method of the invention by supercooling the filling to a temperature below the solidification point thereof. The supercooled filling is injected through a jet nozzle into the cavity of the edible shell at a superatmospheric pressure sufficient to make the filling flowable, and the flowable filling is then permitted to solidify in the cavity.

This method has the advantage that, as the soft or liquid supercooled filling mass leaves the nozzle outlet opening and enters the cavity of the shell, the sudden drop from superatmospheric pressure inside the nozzle to atmospheric pressure around the shell causes the supercooled filling to solidify almost instantly so that the filling will not flow out of the open shell. Thus, a complete solid filling of the shells is obtained in an automatic operation.

Preferably, the temperature of the supercooled filling being injected into the cavity is between about 1°C. to 8°C., most preferably between 3°C and 5°C., below the solidification point of the filling, the superatmospheric injection pressure being correspondingly up to about 20 atmospheres, or 10 atmospheres in the most preferred supercooling range. Such pressures are not too high to cause serious operating difficulties and, on the other hand, permit a complete filling of the cavities.

The apparatus for carrying out the method of the present invention comprises a storage vessel for maintaining the confectionery filling supercooled to a temperature below the solidification point thereof and at a superatmospheric pressure sufficient to make the filling flowable. A jet nozzle is in communication with the storage vessel, and heating means for the storage vessel and the jet nozzle maintains an operating temperature sufficient to keep the filling flowable. Means, such as a transport chain or like conveyor, positions a series of successive edible shells in juxtaposition with the jet nozzle for receiving the flowable filling therefrom, and a preferably intermittently driven means moves the jet nozzle and the positioning means relative to each other.

The above and other objects, advantages and features of the present invention will become more apparent from the following description of a now preferred embodiment thereof, taken in conjunction with the accompanying drawing wherein FIG. 1 is a schematic elevational side view of an apparatus for filling the cavity of an edible shell in accordance with this invention;

With the illustrated apparatus, the cavities of a series of edible shells may be automatically filled seriatim with a confectionery filling whose solidification temperature is no lower than normal room temperature, i.e., between about 60°F. and about 80°F. For this purpose, the filling is supercooled to a temperature below the solidification point thereof, and is injected through a jet nozzle into each cavity at a superatmospheric pressure sufficient to make the filling flowable, i.e., wherein the filling is in a pasty or liquid state. As soon as the filling leaves the jet nozzle outlet opening and enters into the cavity, the filling solidifies since the edible shell is kept at normal room temperature and atmospheric pressure. Thus, the filling is prevented from flowing out of the cavity and forms a solid confectionery center for the edible shell.

The confectionery filling is advantageously a normally solid melt conventionally used in the candy or baking trade for such purpose, which melt is prepared or stored in a heatable pressure vessel under superatmospheric pressure and in a supercooled state.

Figure 1:
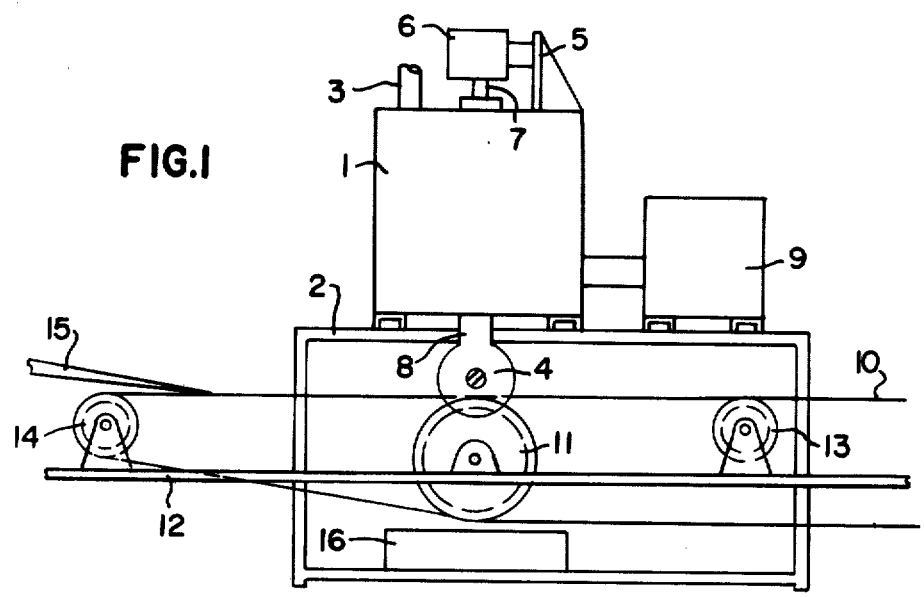

Referring now to the drawing and first to FIG. 1, there is shown a storage vessel 1 so dimensioned as to sustain the superatmospheric pressures maintained therein during operation. If desired, the confectionery filling may be prepared directly in vessel 1 by mixing its ingredients therein. Alternatively, the confectionery filling may be prepared in a special mixing vat and conveyed into storage vessel 1 through inlet conduit 3. If the individual ingredients are fed into the vessel through conduit 3 for preparation of the filling in the vessel, the vessel is first vented, the filling is mixed in the vessel at substantially atmospheric pressure, and after the preparation of the filling in the vessel has been completed, the vessel is repressurized to keep the filling in the vessel at the operating superatmospheric pressure during the filling operation. A support bracket 5 on top of the vessel holds the motor 6 of a stirrer 7 which extends into the vessel to agitate and mix the filling in the vessel during the filling operation and/or while the filling is being prepared from individual ingredients.

A jet nozzle 4 is in communication with the storage vessel 1, an inlet conduit 8 being provided in the illustrated embodiment to connect the nozzle to the vessel. The inlet conduit is strong enough to constitute a support for the jet nozzle on the storage vessel 1. Provision of such a connecting conduit is preferred to the direct mounting of the nozzle on the vessel because this enables the vessel to be positioned more advantageously and without interfering with the filling operation.

Heating means for the storage vessel, the inlet conduit and the jet nozzle maintains an operating temperature sufficient to keep the filling flowable, the illustrated heating means comprising a hot water jacket about the vessel, the conduit and the nozzle. A water heater 9 is connected to the hot water jacket and receives water at a desired temperature from the heater, the water being circulated through the jacket by suitable and conventional menas, such as a pump in the water circuit.

FIG. 1 shows the jet nozzle 4 in rear view (with the actuating solenoid described and shown in FIG. 2 being omitted in FIG. 1), illustrating the horizontal positioning of the nozzle, with the longitudinal axis of the nozzle extending transversely to the upper horizontal stringer of an endless link chain 10 intermittently driven past the outlet opening of the nozzle. The endless link chain 10 is trained over sprockets 13, 14, with centrally positioned drive sprocket 11 engaging the links of the chain in the upper and lower stringer of the chain drive. It is preferred to arrange the drive sprocket 11 below and in substantial alignment with the jet nozzle 4 so that the links of the chain are relatively stable in the filling position in juxtaposition with the jet nozzle and thus to avoid substantial vibrations or oscillations which may cause the filling flowing out of the nozzle opening to miss the cavity of the edible shell carried in dishes 28 which are attached to the chain links.

In the illustrated embodiment, the drive sprocket 11 is mounted on brackets carried by beam 12 which is supported on machine table 2 below its top which supports the storage vessel 1 and the water heater 9. It would, of course, be possible to mount the drive sprocket on a separate table or other support. The guide sprockets 13, 14 are also supported on brackets mounted on beam 12.

A suitable conveying means for the edible shells, suitably consisting of an inclined chute 15 feeds a series of successive edible shells to one end of the transport chain 10 upstream of the jet nozzle 4, each shell being supported in a dish 28 on a respective chain link so that the cavity of the shell faces the outlet opening of the nozzle when it passes the same.

A trough 16 is placed beneath the jet nozzle and the transport chain to receive any excess filling injected into the cavities of the passing shells. This is particularly useful if a slight excess of filling is injected into the cavities to make certain that they are completely filled by the mass. In this case, a stripping member may be mounted laterally of the chain so as to strip excess filling from the filled shells as they pass by the stripping member and simultaneously to smooth the filling at the open end of the shell. If the shell is open at both ends, i.e., if a filled confectionery roll is prepared, such a stripping member will be mounted laterally of the chain and opposite the nozzle, with the shell positioned between the nozzle and this stripping member, so that the jet of filling will be directed into the cavity against this stripping member and the filling will be prevented from flowing out of the opposite open end of the shell while it is being injected into the open shell end in juxtaposition with the nozzle. Such stripping members may take the form of metal sheets 33 shown in FIG. 4.

Figure 2:
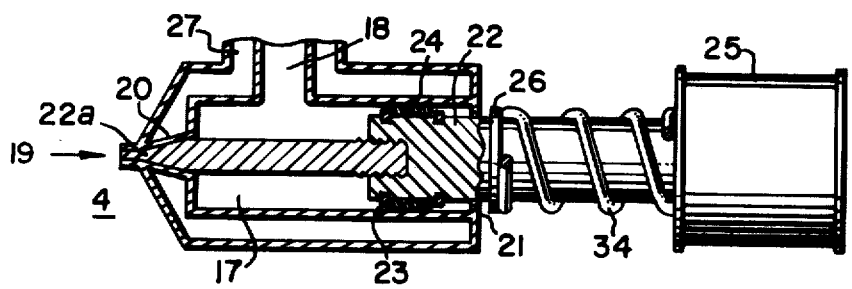
FIG. 2 is a partial section of a preferred jet nozzle for the apparatus.

FIG. 2 shows a preferred jet nozzle construction. This nozzle comprises a hollow body 17 having a longitudinal axis and being in communication with storage vessel 1 to receive the filling therefrom, the end 18 of inlet conduit 8 being shown to open into the hollow body. The forward portion of the hollow nozzle body has a coaxial outlet opening 19 for the filling, this opening forming the conical seat 22a of a needle valve whose needle valve member 22 is movable in the axis of the hollow body 17 between a first or rest position wherein the needle member closes the outlet opening (shown in FIG. 2) and a second or operating position wherein the needle member opens the outlet opening. The valve seat 22a projects from the front wall of the hollow body close to which the inlet conduit end 18 opens into the hollow body while the rear wall 21 thereof is annular to permit a rear portion of the jet needle member 22 to project outwardly through the central bore of the rear wall. This rear portion has an enlarged diameter close to the diameter of the hollow body so as to facilitate the mounting of means for pressure tight sealing of the rear portion of the jet needle member remote from the outlet opening against the lateral wall of the hollow body. Such a seal is necessary to prevent the filling mass under pressure to flow out through the bore in the rear wall. In the illustrated embodiment, this seal comprises a pair of abutment rings 23, 23 mounted in peripheral grooves in the rear portion of the jet needle member 22 and agasket 24 held between the abutment rings, the gasket being resistant to pressures of the magnitude encountered during the filling operation. The illustrated gasket consists of a coil of tightly wound wire or filament of a suitable synthetic resin. The preferred synthetic resin is a blend whose major component is polytetrafluoroethylene or a copolymer thereof, or polytrifluoroethylene. The other component or components of the synthetic resin blend may be so chosen that they increase the hardness and abrasion resistance of the major resin component.

In the illustrated embodiment, a two-part needle valve member is used instead of a unitary structure, the forward portion of the member, which is of reduced diameter, being screwed into the rear portion of larger diameter. Such a structure makes it possible to make fine adjustment when the nozzle is assembled.

As shown, a solenoid 25 is in operative connection with the outwardly projecting rear portion of the jet needle member 22, this rear portion extending into, and thus forming the core of, the solenoid so that the needle member is movable in the axis of the nozzle to open and close the needle valve. Upon actuation of the solenoid, the jet needle member 22 is withdrawn from valve seat 22a to open the valve. A compression spring 34 is coiled about the outwardly projecting rear portion of needle member 22 between an abutment ring 26 and the solenoid to move the jet needle member back into the closing position when the solenoid is not actuated. The distance of the abutment ring 26 from the rear wall 21 of the hollow body 17 at the open position of the valve must be at least equal to the stroke of the needle valve member during its opening movement so that the valve may be completely closed when the needle valve member is spring-biased back into its closed position. This distance may be adjusted, for instance, during assembly by suitably determining the distance to which the front portion of the jet needle member is screwed into the rear portion thereof.

The solenoid is fixedly mounted on the apparatus in any suitable manner (not shown), for instance by means of a bracket attached to storage vessel 1, to the top of table 2 or even to the rear wall of the nozzle. The water jacket 27 surrounds the inlet conduit and the hollow body of the nozzle.

The assembly of the nozzle will be facilitated if it comprises two parts, the annular rear wall of the hollow body 17 of the nozzle constituting a separate part so that the interior of the hollow body is readily accessible when the rear wall is removed. In this manner, the length of the needle valve member may be suitably adjusted and, after insertion of the needle valve member 22, with its pressure-tight seal, into the interior of the hollow body 17, the annular rear wall is fixed to the body by suitably pressure resistance fastening means. In a simple fastening, the rear wall may be welded to the hollow body and the water jacket 27 may be welded to the rear wall.

Figure 3:
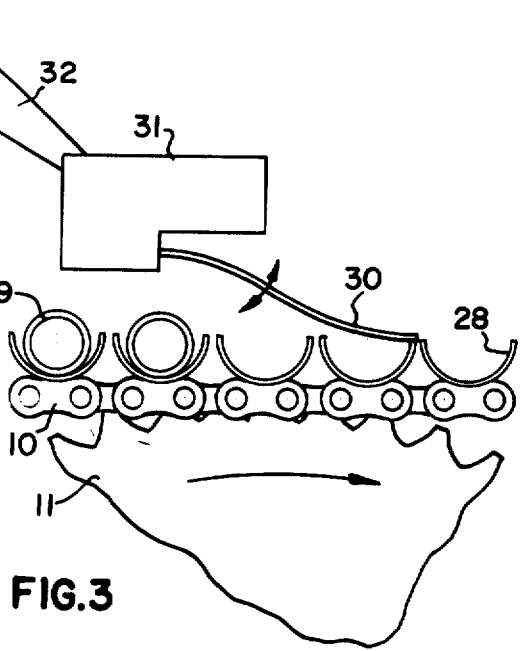
FIG. 3 is a partial schematic side view of a detail of the apparatus showing a portion of the transport link chain for the edible shells and a resilient control for actuating intermittent operation.

FIG. 3 illustrates a portion of the transport chain 10 with drive sprocket 11 in an enlarged view to show more clearly the individual links of the chain each carrying a dish 28 for supporting each edible shell 29 to be filled. The illustrated shells are open-ended tubes, for instance of baked wafer dough, which are to be filled with a confectionery filling.

The chain drive and the needle valve of jet nozzle 4 are intermittently and synchronously operated under the control resilient tongue 30 which presses against respective dishes 28 and is lifted by the edible shells on the dishes as as they successively move into juxtaposition with the outlet opening of the nozzle. The downwardly biased tongue 30 is mounted vertically above the drive sprocket 11 and slides over the dishes 28 during the movement of the chain. The tongue is pivoted in control housing 31 which houses an electromagnetic switch which is actuated by the rear end of the tongue when the same is lifted by an edible shell. A control circuit connects the switch in the control housing to solenoid 25 as well as to a motor driving sprocket 11, the control being so arranged that the solenoid closes the needle valve of the nozzle during the intermittent movement of the chain and opens the valve when the chain stands still, with an edible shell in juxtaposition with the valve outlet opening. A support rod 32 fixedly mounts the control housing 31 on the apparatus, for instance on machine table 2.

The forward end of control tongue 30 slides over the dishes 28 in the region of the jet nozzle 4, the resilient movement of the forward end of the tongue in the direction of the curved arrow indicating when a shell is in front of the nozzle (causing the tongue end to be lifted by the shell) and when the dish is empty (causing the tongue end to snap down). The control circuit itself is conventional.

Figure 4:
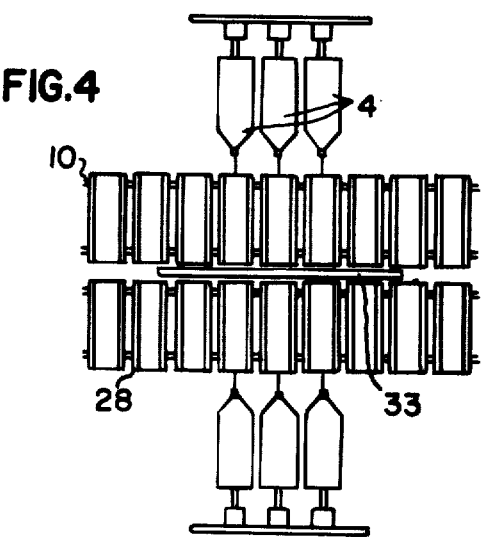
FIG. 4 is a schematic top view of such an apparatus with a pair of transport chains and three jet nozzles for filling three shells at a time on each chain.

FIG. 4 schematically illustrates an embodiment with a pair of storage vessels each with a series of three adjacently arranged jet nozzles 4. The storage vessels are spaced apart, and two adjacent parallel transport chains 10 are arranged in the space between the storage vessels to move respective series of successive edible shells carried on dishes 28 in juxtaposition with respective jet nozzles 4. Separating baffles 33 are mounted between the adjacent transport chains in line with the jet nozzles. Thus, if the shells are open at both ends, the baffles 33 will close the open ends of the shells opposite the open ends which receive the filling from the jet nozzles.

With the embodiment of FIG. 4, six shells can be filled simultaneously, and the control for intermittently moving the transport chains 10 is arranged to move the chains stepwise by respective distances corresponding to the distance between the end nozzles of the series of nozzles.

It would also be possible to fill several shells simultaneously by providing each nozzle with a plurality of outlet openings. In this case, a like plurality of needle valve members may be mounted on a single rear part for axial movement by solenoid 25, for example.

A structural simplification may be attained with a nozzle having a single outlet opening or several openings with cooperating need valve members if the rear postion of the needle valve member or members does not project rearwardly out of the hollow nozzle body but the rear wall is pressure-tightly sealed on the body and the actuating solenoid is mounted inside the hollow body. In this case, the windings of the solenoid surround the rear portion of the needle valve member or members, which rear portion forms the core of the solenoid, and the hollow body is made of a material which does not interfere with the operation of the solenoid.

Following is a specific example illustrating, but not limiting, the method of the present invention.

A confectionery filling was prepared by mixing, by weight, two parts of cocoa, five parts of skim milk powder, 43 parts of sugar, 30 parts of fat, and 20 parts of ground hazelnuts (without sugar). The solidification point of this filling at atmospheric pressure is at a temperature of about 16°C. to 20°C. When this filling was supercooled by about 3°-5°C. below the solidification temperature to about 13°-15°C., it was almost liquid at a pressure of ten atmospheres. When injected from the nozzle 4 of the illustrated apparatus under this pressure into a tubular wafer shell spaced about 2 cm from the nozzle opening, the filling solidified almost instantly in the cavity of the shell. The dimension of the nozzle opening was so chosen that the shell cavity was completely filled during the time the nozzle valve remained open, this dimension the valve opening time and the corresponding time for holding the transport chain 10 still being suitably coordinated.

What is claimed is:

1. A method of mechanically filling the cavity of an open edible tubular wafer with a melted confectionery filling whose solidification point at atmospheric pressure is no lower than normal room temperature, comprising the steps of supercooling the melted filling under superatmospheric pressure to a temperature below the solidification point thereof, and essentially horizontally injecting the supercooled filling through a jet nozzle into the cavity of the tubular wafer at the superatmospheric pressure while maintaining the tubular wafer in an essentially horizontal position whereby the filling solidifies in the cavity.

2. The method of claim 1, wherein the temperature of the supercooled filling being injected into the cavity is between about 1°C. and 8°C. below the solidification point at atmospheric pressure, the injection pressure being up to about 20 atmospheres.

3. The method of claim 2, wherein the temperature of the supercooled filling being injected into the cavity is between about 3°C. and 5°C. below the solidification point at atmospheric pressure, the injection pressure being up to about 10 atmospheres.

4. The method of claim 1, wherein the tubular wafer is maintained at about normal room temperature and about atmospheric pressure to permit substantially immediate solidification of the filling in the cavity.

* * * * *